United States Patent [19]
Bhuta et al.

[11] 3,820,062
[45] June 25, 1974

[54] ACOUSTO-OPTICAL UNDERWATER IMAGING SYSTEM

[75] Inventors: Pravin G. Bhuta, Torrance; Robert Aprahamian, Marina Del Rey; Jerold L. Jacoby, Lakewood, all of Calif.

[73] Assignee: TRW Inc., Redondo Beach, Calif.

[22] Filed: Jan. 2, 1973

[21] Appl. No.: 320,130

[52] U.S. Cl.............. 340/3 R, 73/67.5 R, 340/5 MP
[51] Int. Cl................................................ G01s 9/66
[58] Field of Search................ 340/3 R, 5 MP, 5 H; 73/67.5 R, 67.5 H, 67.6, 67.7, 67.8 R, 67.8 S; 332/7.51

[56] References Cited
UNITED STATES PATENTS
| | | | |
|---|---|---|---|
| 3,510,833 | 5/1970 | Turner......................... | 340/5 MP X |
| 3,626,753 | 12/1971 | Appahamian et al........... | 340/5 H X |
| 3,685,008 | 8/1972 | Bhuta et al..................... | 340/3 R |

*Primary Examiner*—Richard A. Farley
*Attorney, Agent, or Firm*—Daniel T. Anderson; Donald R. Nyhagen; Edwin A. Oser

[57] ABSTRACT

An underwater acousto-optical imaging system for receiving water-borne acoustic waves representing an image of an object in the water and converting the image information to a corresponding optical image of the object. The acoustic waves are focused by an acoustic lens into a Bragg coupling medium wherein a monochromatic light beam is Bragg diffracted by the acoustic waves to produce a modulated light side band defining the optical image. A television camera converts this optical image to electrical signals for viewing of the image at a remote video monitoring station. The imaging system may be driven in a scanning motion for operation in a search made and may include an acoustic source for generating acoustic probing waves which reflect from objects in the water back to and are converted to optical images by the imaging system.

21 Claims, 5 Drawing Figures

PATENTED JUN 25 1974 3,820,062
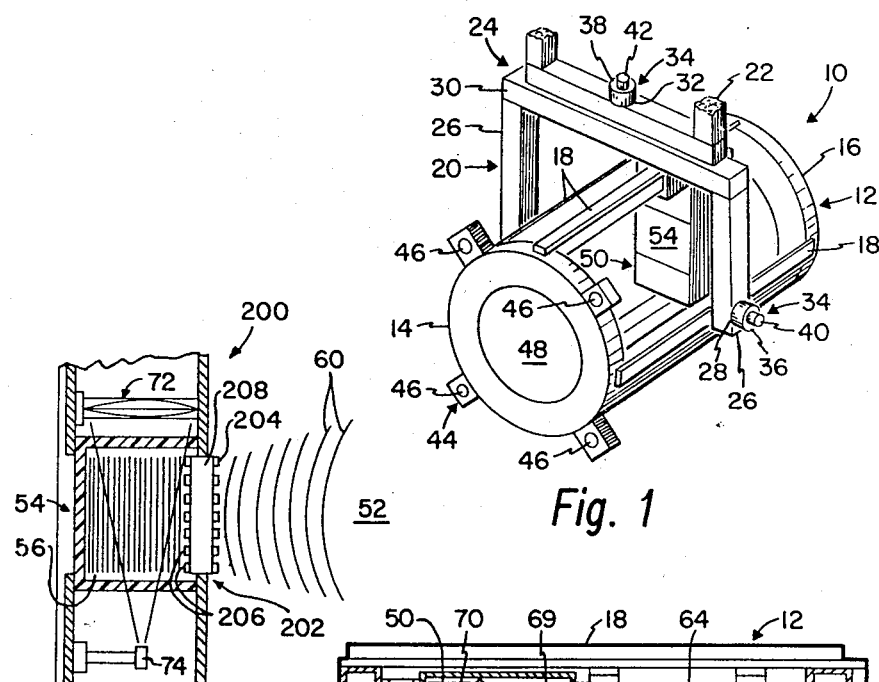
Fig. 1
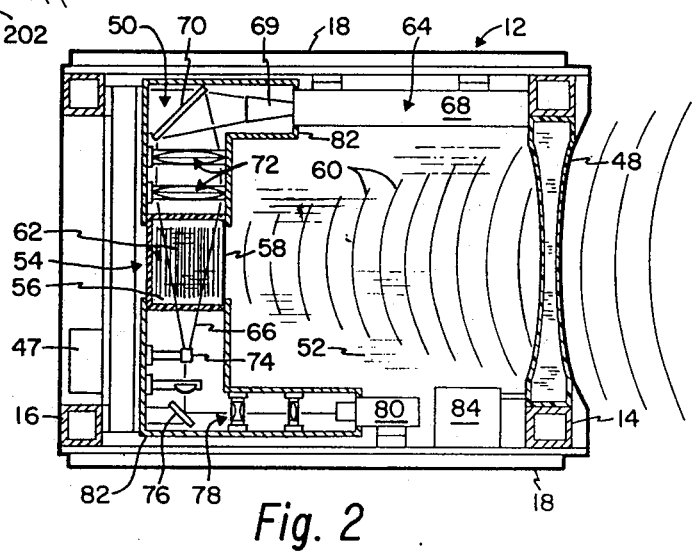
Fig. 2
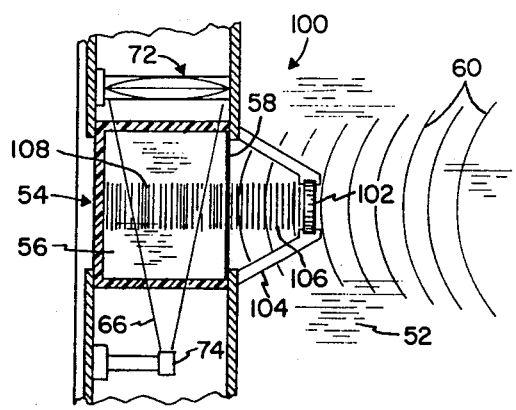
Fig. 3
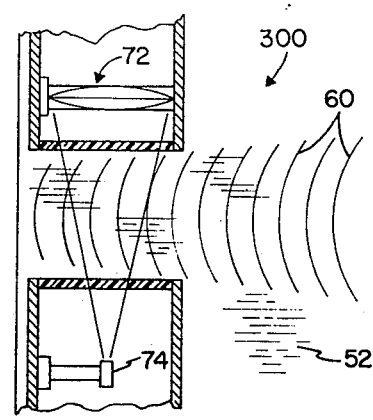
Fig. 4
Fig. 3A

ACOUSTO-OPTICAL UNDERWATER IMAGING SYSTEM

RELATED APPLICATIONS

Reference is made to copending applications of the inventors, U.S. Pat. Ser. No. 258,057, filed May 30, 1972, entitled "Acousto-Optical Imaging Method and Apparatus," by P. G. Bhuta and R. Aprahamian; U.S. Pat. Ser. No. 275,175, filed July 26, 1972, entitled "Acousto-Optical Multi-Constituent Flow Monitoring Method and Apparatus," by P. G. Bhuta, R. L. Johnson, D. J. Graham and R. Aprahamian, and U.S. Pat. Ser. No. 319,987, filed Jan. 2, 1973, entitled "Acousto-Optical Imaging Method and Apparatus for Objects in High Acoustic Impedance Media," by P. G. Bhuta, R. L. Johnson, R. Aprahamian and J. L. Jacoby.

BACKGROUND OF THE INVENTION

1. Field of Invention invention

This invention relates generally to the art of optically imaging objects by the so-called acousto-optical imaging technique. The invention relates more particularly to a novel underwater acousto-optical imagning system.

2. Prior Art:

Simply stated, acousto-optical imaging involves optically imaging an object by acoustically "illuminating" the object, i.e., impinging acoustic wave energy on the object, in such a way that the wave energy is distorted by the object and the distorted acoustic waves emanating from the object carry information representing an image of the object. This image information is converted to a corresponding optical image of the object by projecting a substantially monochromatic light beam through the distorted acoustic waves to impinge the wave fronts at an oblique angle known as the Bragg angle. The light waves are diffracted and modulated by the acoustic waves in such a way that the light emerging from the acoustic waves includes a modulated light side band defining an optical image corresponding to the image information carried by the acoustic waves. This optical image may be viewed directly through a suitable optical objective, projected onto a viewing screen, or reproduced for viewing by a video system.

The acousto-optical imaging apparatus for carrying out the acousto-optical imaging technique described above includes a Bragg cell containing an acousto-optical coupling medium through which the distorted acoustic waves propagate. The monochromatic light beam is projected through this cell transverse to the propagation path of the acoustic waves through the coupling medium.

For a more detailed explanation of acousto-optical imaging, reference may be had to the earlier mentioned copending applications and the prior art references cited therein as well as to U.S. Pat. No. 3,685,008.

SUMMARY OF THE INVENTION

The invention provides a novel underwater acoustooptical imaging system for imaging objects in a large body of water, such as an ocean, lake or river. The objects may be floating, totally submerged, or resting on the bottom.

The imaging system receives acoustic waves propagating through the water and carrying information defining or representing an image of an object and converts this information by Bragg diffraction into a corresponding optical image of the object. The acoustic waves are generated by an acoustic source which is acoustically coupled to the water in such a way that the waves propagate from the source through the water to an object to be imaged and then from the object to the imaging system. The waves may arrive at the imaging system by way of reflection from the object or transmission through the object. In either event, the acoustic waves from the acoustic source, hereafter referred to as probing waves, are distorted by the object in such a way that the distorted waves emanating from the object contain information representing an image of the object. The imaging system receives these distorted waves and converts their image information to a corresponding optical image of the object. The acoustic probing wave source may be located at and form part of the imaging system or may be situated at a remote location some distance from the imaging system.

The imaging system has an acoustic lens for receiving and focusing the water-borne distorted acoustic waves from an object to be imaged and an acousto-optical imaging means for converting the image information in the focused acoustic waves to a corresponding optical image. The lens is adjustable to focus the imaging system at different ranges or distances. In the event the acoustic probing wave source is located at the imaging system, it is oriented to launch probing acoustic waves with a propagation direction generally parallel to the lens axis. The waves are reflected from the object back to the lens for imaging.

The imaging system, and the acoustic probing wave source if located at the imaging system, may be mounted on a motor driven support for scanning motion to permit operation of the imaging system in a search mode. This scanning motion may be controlled and monitored from a remote monitoring station and the optical image of an object may be transmitted to the station for viewing by a closed circuit television system including a television camera embodied in the imaging system.

According to another feature of the invention, the frequency of the probing acoustic source may be varied between a relatively low frequency for searching and a higher frequency for improved image definition. The imaging system may also utilize the wave front reconstruction technique or the high frequency pumping technique described in the earlier mentioned copending applications to permit utilization of relatively low frequency, long range probing waves and yet obtain relatively high quality images.

BRIEF DESCRIPTION OF THE DRAWINGS

FIG. 1 is a perspective view of an underwater acousto-optical imaging system according to the invention;

FIG. 2 is an enlarged longitudinal section through the main housing of the imaging system in FIG. 1;

FIG. 3 is a fragmentary detail of a modified acousto-optical imaging system according to the invention.

FIG. 3A is a fragmentary detail of a further modified imaging system according to the invention; and FIG. 4 is a fragmentary detail of a further modified imaging system according to the invention.

DESCRIPTION OF THE PREFERRED EMBODIMENTS

Referring first to FIGS. 1 and 2 of the drawings, there is illustrated an acousto-optical imaging system 10 including a support 12 in the form of an open frame-like housing of generally cylindrical form. This housing has front and rear annular frame members or rings 14, 16 rigidly joined by longitudinal struts or bars 18. Support 12 is mounted by gimbal means 20 on a base 22 for scanning motion relative to the base. Base 22 may be attached to any suitable supporting structure, such as the hull of a ship, a submerged foundation, or other support.

Gimbal means 20 includes a yoke 24 with depending arms 26 which are pivotally attached at 28 to two diametrically opposite frame bars 18 of the housing 12 for rotation of the housing on a normally horizontal transverse axis of the housing located about midway between its ends. The upper horizontal cross member 30 is pivotally attached at 32 to the mounting base 22 for rotation of the yoke and housing 12 relative to the base on a normally vertical axis intersecting the horizontal gimbal axis. Thus, the housing 12 is supported on the base 22 for both horizontal and vertical scanning motion.

Means 34 are provided for driving the housing 12 in its scanning motion and for monitoring the position of the housing relative to the mounting base 22. The particular means shown comprise rotary hydraulic actuators 36, 38 for driving the housing on its horizontal and vertical scanning axes and transducers 40, 42 for generating position signals representing the position of the housing on these axes. The actuators may be controlled from and the position signals fed to a remote monitoring station.

As noted earlier and explained in more detail later, the imaging system 10 is used in conjunction with an acoustic source for launching acoustic probing waves into a body of water for interception by objects in the water. An object which intercepts these probing waves distorts the waves in such a way that the distorted waves leaving or emanating from the object carry information defining or representing an image of the object. The imaging system receives these distorted waves and converts the latter by Bragg diffraction to a corresponding optical image of the object. The imaging system may receive the distorted probing waves by reflection from or transmission through the object. The acoustic probing wave source may be located remote from the imaging system or directly at the imaging system.

In the particular imaging system shown, the acoustic probing wave source 44 comprises four separate acoustic transducers 46 mounted about the front housing frame ring 14 and driven by an oscillator 47. These probing transducers are oriented to launch probing acoustic waves forwardly, substantially parallel to the longitudinal axis of the housing 12. If these probing waves encounter an object in the water, they are reflected from the object back to the imaging system 10 as distorted acoustic waves which carry information defining an image of the object.

In order to convert the image information in these returning or reflected acoustic probing waves to a corresponding optical image of the object, the imaging system 10 has an acoustic lens 48 and acousto-optical imaging means 50. Lens 48 is mounted within the front housing frame ring 14 and collects and focuses the returning reflected probing acoustic waves within an acoustic wave transmission medium 52 which fills the interior space of the housing 12 behind the lens. This acoustic medium contacts the rear face of the lens 48. Accordingly, acoustic waves incident on the front face of the lens propagate through the lens into the acoustic medium to establish in the medium focused acoustic waves containing essentially the same image information as the distorted probing waves reflected from an object in the water. The acousto-optical imaging means 50 receives these focused acoustic waves and converts their image information to an optical image.

Imaging means 50 comprises a Bragg cell 54 mounted on the rear frame ring 16 of the housing 12 along the axis of the acoustic lens 48. This Bragg cell contains an acousto-optical coupling medium 56 and has a front acoustic coupling means 58, in this instance an acoustic transmission wall such as an elastic membrane or diaphram, which acoustically couples the coupling medium to the acoustic medium 52 in the housing 12. Wall 58 is located in a plane substantially normal to the axis of the acoustic lens 48 and situated near the focal point of the acoustic lens 48, such that the cross-sectional area of the focused acoustic beam from the lens at said plane approximates the surface area of the wall. Accordingly, substantially the entire surface area of the wall is exposed to the focused acoustic beam from the lens.

From the description to this point, it will be understood that the water-borne distorted acoustic waves incident on the acoustic lens 48 from an object in the water and carrying information defining an image of the object propagate through and are focused by the lens to establish within the acoustic medium 52 acoustic waves 60 carrying vertically the same image information as the incident waves. The Bragg cell acoustic transmission wall 58 couples the acoustic waves from the acoustic medium 52 into the coupling medium 56 to establish in the latter medium acoustic waves 62 also containing essentially the same image information as the distorted waves from the object.

The imaging means 50 further comprises means 64 for projecting a beam 66 of monochromatic light through the coupling medium 56 transverse to the direction of propagation of the acoustic waves 62 through the medium to impinge the acoustic wave fronts at the Bragg angle. Beam projection means 64 includes a monochromatic light source 68, in this instance a laser, mounted along one side of the housing 12 with its axis parallel to the housing axis. The light beam from the laser is expanded by a diverging lens system 69 and then turned inwardly 90°, along the axis of the Bragg cell 54, by a mirror 70. After reflection from the mirror, the beam passes through a converging lens system which directs a cone of light through the Bragg cell to a microscope objective 74 at the opposite side of the cell. As noted earlier and explained in more detail shortly, the light emerging from the Bragg cell includes a modulated light side band which forms an optical image corresponding to the image information carried by acoustic waves propagating through the coupling medium 56 within the cell. This optical image is enlarged by the microscope objective 74 and projected forwardly, by a mirror 76 and a focusing lens system 78, to a television camera 80 mounted on the side of housing 12, diametrically opposite the light source or laser 68. The optics 69, 70, 72, 74, 76 and 78 are sealed in water-tight enclosures 82 capable of withstanding the pressure at the depth at which the imaging system is designed to operate.

The operation of the imaging system 10 will now be explained. The imaging system is submerged in water, such that the latter fills the interior of the housing 12 to provide the acoustic wave transmission medium 52. The acoustic probing transducers 46 are pulsed simultaneously to launch acoustic probing wave pulses into the water with propagation directions generally parallel to the axis of the acoustic lens 48. If these waves encounter an object in the water, they are reflected back to the acoustic lens 48, which focuses the incident wave energy onto the acoustic transmission wall 58 of the Bragg cell 54 to produce the acoustic waves 62 in the coupling medium 56. As noted earlier, the probing waves are distorted by the object in such a way that the waves reflected to the acoustic lens contain information defining an image of the object. The acoustic waves 62 produced in the coupling medium 56 carry this same image information.

As explained in U.S. Pat. No. 3,685,008, the light waves in the light beam cone 66 projected through the coupling medium 56 impinge the wave fronts of the acoustic waves 62 in the coupling medium 56 at the Bragg angle to effect Bragg diffraction of the light waves by the acoustic waves. The light waves are thereby diffracted and modulated by the acoustic waves in such a way that the light emerging from the coupling medium includes a modulated light side bane which forms or defines an optical image of the object impinged by the probing waves from the probing transducers 46. This acousto-optical imaging process is well known and explained in U.S. Pat. No. 3,685,008 as well as the earlier mentioned copending applications and cited references therein and hence need not be further elaborated upon. Suffice it to say that the acoustic lens 48 improves the angular resolution of the imaging system in a manner similar to an optical lens and permits imaging of the objects at large ranges.

The optical image thus produced by the imaging means 50 is enlarged by the objective 74 and projected by the mirror 76 and lens system 78 to the television camera 80. This camera converts the image to electrical signals for transmission to a remote video monitoring station where the image is reproduced for viewing on a television monitor.

The imaging system 10 includes focusing adjustment means 84 for the acoustic lens 48 to permit imaging of objects at different ranges. The particular lens shown is a hollow liquid-filled lens with flexible walls whose curvature is adjustable, to adjust the focal length of the lens, by supplying liquid under pressure to and venting liquid from the lens. Focusing adjustment means 84 comprises means for thus supplying liquid to and venting liquid from the lens and is controllable to adjust the lens focus from the remote monitoring station. Focusing adjustment of the lens, of course, may also be accomplished by adjustment of the lens along its axis, toward and away from the Bragg cell 54. Focusing adjustment means controllable from the monitoring station may also be provided for the lens system 78 to bring into focus at the television camera 80 various cross-sectional planes of the optical image produced by the acousto-optical imaging means 50.

It will be recalled from the earlier description that the support or housing 12 of the imaging system is drivable in a scanning motion by the actuators 34, 36. This scanning motion may occur concurrently with pulsing of the probing transducers 46 to effect operation of the imaging system in a search mode. As noted earlier, the scanning actuators are controllable from the remote monitoring station. The outputs of the scanning transducers 40, 42 are transmitted to this station for monitoring of the scanning motion at the station. The light source 68 may be pulsed in timed relation to pulsing of the probing transducers to effect range gating operation of the imaging system in the manner described in copending application U.S. Pat. Ser. No. 258,057 and thereby permit the range of an imaged object to be determined.

As noted in U.S. Pat. No. 3,685,008 and application Ser. No. 319,987, acousto-optical imaging in a relatively high acoustic impedance medium, such as water, presents two conflicting requirements. First, effective propagation of the acoustic probing waves through water requires a realtively low probing wave frequency on the order of a few kilohertz. Second, effective transformation by Bragg diffraction of image information carried by acoustic waves to a high quality optical image requires a relatively high acoustic frequency on the order of 100 kilohertz or higher.

According to a feature of the invention, the oscillator driver 47 for the four acoustic probing transducers 46 is adjustable to vary the probing wave frequency between a relatively low frequency for long range search and a higher frequency for close range inspection with fine image definition.

Alternatively, the imaging system may utilize either the wave front reconstruction technique described in U.S. Pat. No. 3,685,008 or the high frequency acoustic pumping technique described in application Ser. No. 319,987 to permit the use of low frequency probing waves and yet provide high frequency acoustic waves for imaging by Bragg diffraction and thereby satisfy the above stated conflicting requirements for effective acousto-optical imaging objects in water. The modified acousto-optical imaging system 100 of FIG. 3, for example, embodies a high frequency acoustic pumping transducer 102 for utilizing the high frequency pumping technique of the latter application. Transducer 102 is mounted in front of the Bragg cell acoustic transmission wall 58 by means of struts 104. The transducer is driven by a high frequency (i.e 100 kilohertz or higher) oscillator to effect propagation of high frequency pumping waves 106 through the acoustic medium or water 52 and wall 58 into the coupling medium 56 within the Bragg cell 54. As explained in the latter application, these high frequency pumping waves and the low frequency distorted probing waves 60 from an object in the water undergo non-linear interaction to produce in the coupling medium 56 acoustic wave sets 108 having frequencies equal to the sum and difference, respectively, of the high and low frequencies and each carrying information defining an image of the object. The convergent light beam 66 is projected through the coupling medium 56 to impinge the wave fronts of one wave set at the Bragg angle and thereby produce an optical image of the object which is received by the television camera 80, as before. Except for the pumping transducer, the imaging system of FIG. 3 is identical to that of FIGS. 1 and 2.

The modified imaging system 200 of FIG. 3A utilizes the wave front reconstruction technique of U.S. Pat. No. 3,685,088 by employing as the acoustic coupling means between the acoustic media 52, 56 an acoustic wave converter 202 of the kind described in the patent. This converter has arrays of acoustic receiving and emitting transducers 204, 206 acoustically coupled to the acoustic media 52, 56, respectively, and frequency multiplying means 208 connecting the corresponding transducers of the two arrays. The receiving transducers 204 receive the low frequency distorted probing waves 60 and actuate their corresponding emitting transducers 206 through the frequency multiplying means 208 to produce in the coupling medium 56 acoustic waves of higher frequency than but containing essentially the same image information as the probing waves.

The modified imaging system 300 of FIG. 4 is also identical to that of FIGS. 1 and 2 except that the front and rear walls of the Bragg cell are effectively eliminated, such that the coupling medium or water 52 fills the Bragg cell space to form the acousto-optical coupling medium in which Bragg diffraction occurs. The acoustic lens of the imaging system is adjusted to focus the incident distorted probing waves within the convergent light beam 66. This modification may be used, obviously, only if the medium 52 is sufficiently clear to transmit the light beam. In some cases, the water in which the imaging system operates may be sufficiently clear to permit imaging, in which the housing of the imaging system may have the open frame construction shown in FIG. 1. If the water is not sufficiently clear, a clear acoustic medium may be sealed in the housing to provide both the acoustic medium 52 and coupling medium 56. It is apparent, of course, that the acoustic medium 52 in FIGS. 1-3 may also be sealed in the housing.

It will be immediately evident to those versed in the art that the underwater imaging system of the invention is capable of many varied applications. A few of these applications are listed below.

1. Ocean Bottom Inspection

This application involves inspection of large areas of the ocean at a rapid rate to locate large objects such as strategic weapons which may be placed below the surface of the ocean. The application would use a probing frequency of several hundred KHz and might have a medium range on the order of 600 meters and an angular resolution of less than 0.004 radians with a 60° field of view.

2. Helicopter Based Mine Hunting

This application involves a lightweight, maneuverable, real-time, underwater viewing system for helicopter based mine hunting system. The real-time optical image would be displayed in the helicopter. The mine hunting system may include, in addition to the viewing system, a wire-guided destruct device. A system could be designed which would have the capability to image a small mine at a range up to 250 meters.

3. Lost Object Recovery

This application would utilize a low probing frequency for searching a large area and a high probing frequency to classify the object from a close-up distance. Predicted system range is 100 meters in brown water.

4. Long-Range, Large-Target Classification

This application involves imaging at extreme ranges with adequate resolution for classifying large hard targets. Using the wavefront reconstruction technique or high frequency pumping technique, which permits optical image formation with low-frequency probing waves (of the order of 10 KHz), target detection and classification at ranges of up to 1,500 meters is possible.

5. Harbor Surveillance

This application involves image formation of both soft and hard targets over a very long range with widely separated probing wave source and imaging system, and the transmission mode rather than a reflected mode. Using 200 KHz probing waves, useful range varies between 300 and 2,500 meters depending upon water conditions. It would be possible to monitor in a central control room the output of several receivers which are planted in strategic areas. The area of interest would be harbors and places where there is submarine traffic.

6. Acoustic Radar

This application involves range gated acousto-optical imaging for submarine navigational purposes. The real-time optical image could be displayed in a control room and aid in navigation.

What is claimed as new in support of Letters Patent is:

1. An underwater acousto-optical imaging system for transforming water-borne acoustic waves carrying information representing an image of an object in the water to an optical image corresponding to said image information, comprising:

a Bragg cell containing an acousto-optical coupling medium, means including an acoustic converging lens for collecting and effecting excitation of said medium by said water-borne acoustic waves to produce in the medium acoustic waves carrying essentially the same image information as said water-borne waves, and means for projecting a substantially monochromatic light beam through said medium in such a manner as to effect Bragg diffraction of the light waves by the acoustic waves in the medium and thereby produce a modulated light side band defining an optical image corresponding to the image information carried by the acoustic waves in the medium.

2. An imaging system according to claim 1 including:

means for effecting focusing adjustment of said lens.

3. An imaging system according to claim 1 wherein:

said lens has a front side to be acoustically coupled to the water and a rear side, said coupling medium excitation means includes an acoustic wave transmission medium in contact with the rear side of said lens through which acoustic wave energy propagates rearwardly from said lens, and coupling means acoustically coupled to said media for producing in said coupling medium acoustic waves carrying essentially the same image information as the acoustic waves propagating through said wave transmission medium from said lens and arriving at a plane near the focal point and transverse to the axis of said lens.

4. An imaging system according to claim 3 wherein:

said coupling means comprises an elastic acoustic transmission member separating said media and located in said plane.

5. An imaging system according to claim 3 wherein:

said coupling means comprises a first array of acoustic transducers located in said plane and acoustically coupled to said wave transmission medium and each producing an electrical signal representing the acoustic wave energy incident on the transducer, a similar second array of acoustic transducers acoustically coupled to said coupling medium, and frequency multiplying means connecting corresponding transducers of the two arrays.

6. An imaging system according to claim 1 wherein:

said lens has an outer side to be acoustically coupled to the water and an inner side in contact with said coupling medium.

7. An underwater acousto-optical imaging system for transforming water-borne acoustic waves carrying information representing an image of an object in the water to an optical image corresponding to said image information, comprising:
   a mounting base for attachment to a supporting structure, a support,
   means mounting said support on said base for scanning motion relative to said base,
   a Bragg cell on said support containing an acousto-optical coupling medium,
   means on said support for effecting excitation of said coupling medium by said water-borne acoustic waves to produce in said medium acoustic waves carrying essentially the same image information as said water-borne waves, and
   means on said support for projecting a substantially monochromatic light beam through said medium in such a manner as to effect Bragg diffraction of the light waves by the acoustic waves in the medium and thereby produce a modulated light side band defining an optical image corresponding to the image information carried by the acoustic waves in the medium.

8. An imaging system according to claim 7 including:

means for driving said support in its scanning motion, and
means for monitoring the position of said support relative to said base.

9. An imaging system according to claim 7 including:

means on said support for transmitting acoustic probing waves through the water to said object for reflection as said water-borne waves to said imaging system.

10. An imaging system according to claim 9 including:
   means for adjusting the frequency of said probing waves.

11. An imaging system according to claim 7 wherein:

said coupling medium excitation means includes an acoustic converging lens for collecting water-borne wave energy.

12. An imaging system according to claim 11 including:
   means for effecting focusing adjustment of said lens.

13. An imaging system according to claim 7 wherein:

said support has front and rear ends,
said coupling medium excitation means includes an acoustic converging lens at the front end of said support, and
said Bragg cell is located rearwardly of said lens.

14. An imaging system according to claim 13 wherein:
   said lens has a front side to be acoustically coupled to the water and a rear side,
   said coupling medium excitation means includes an acoustic wave transmission medium in contact with the rear side of said lens through which acoustic wave energy propagates rearwardly from said lens, and coupling means acoustically coupled to said media for producing in said coupling media acoustic waves carrying essentially the same image information as the acoustic waves propagating through said wave transmission medium from said lens and arriving at a plane near the focal point and transverse to the axis of said lens.

15. An imaging system according to claim 14 wherein:
   said coupling means comprises an elastic acoustic transmission member separating said media and located in said plane.

16. An imaging system according to claim 14 wherein:
   said coupling means comprises a first array of acoustic transducers located in said plane and acoustically coupled to said wave transmission medium and each producing an electrical signal representing the acoustic wave energy incident on the transducer, a similar second array of acoustic transducers acoustically coupled to said coupling medium, and frequency multiplying means connecting corresponding transducers of the two arrays.

17. An imaging system according to claim 13 wherein:
   said lens has an outer side to be acoustically coupled to the water and an inner side in contact with said coupling medium.

18. An underwater acousto-optical imaging system for transforming water-borne acoustic waves carrying information representing an image of an object in the water to an optical image corresponding to said image information, comprising:
   a housing having front and rear ends,
   an acoustic lens at the front end of said housing having a front side to be acoustically coupled to the water and a rear side,
   a Bragg cell at the rear end of said housing containing an acousto-optical coupling medium,
   there being a space between said lens and Bragg cell for containing an acoustic wave transmission medium in contact with the rear side of said lens, whereby said lens is adapted to receive said water-borne acoustic waves and to propagate rearwardly through said transmission medium acoustic waves carrying essentially the same image information as said water-borne waves, coupling means on said housing acoustically coupled to said coupling medium and adapted to be acoustically coupled to said transmission medium for producing in said coupling medium acoustic waves carrying essentially the same image information as the acoustic waves in said transmission medium, means on said housing including a light source along one side of said space for projecting a substantially monochromatic light beam through said coupling medium in such a manner as to effect Bragg diffraction of the light waves by the acoustic waves in the coupling medium and thereby produce a modulated light side band defining an optical image corresponding to the image information carried by the acoustic waves in the coupling medium, and means on said housing including a television camera along the opposite side of said space for converting said optical image to electrical signals to permit viewing of said optical image at a remote video monitoring station.

19. An imaging system according to claim 18 including:

openings in said housing for filling of said space with water, a mounting base for attachment to a supporting structure, means mounting said housing on said base for scanning motion relative to said base, means for driving said housing in its scanning motion, means for monitoring the position of said housing relative to said base, means for effecting focusing adjustment of said lens, and acoustic transducer means mounted on said housing for transmitting acoustic probing waves through the water in a propagation direction generally for reflection from objects in the water to said lens as said water-borne waves.

20. An underwater acousto-optical imaging system for transforming water-borne acoustic waves carrying information representing an image of an object in the water to an optical image corresponding to said image information, comprising:

a housing having front and rear ends, an acoustic lens at the front end of said housing having a front side to be acoustically coupled to the water and a rear side, there being a space behind said lens for containing an acousto-optical coupling medium in contact with the rear side of said lens, whereby said lens is adapted to receive said water-borne acoustic waves and propagate rearwardly through said medium acoustic waves containing essentially the same information as said water-borne waves, means on said housing including a light source along one side of said space for projecting a substantially monochromatic light beam through said coupling medium in such a manner as to effect Bragg diffraction of the light waves by the acoustic waves in the coupling medium and thereby produce a modulated light side band defining an optical image corresponding to the image information carried by the acoustic waves in the coupling medium, and means on said housing including a television camera along the opposite side of said space for converting said optical image to electrical signals to permit viewing of said optical image at a remote video monitoring station.

21. An imaging system according to claim 20 including:

a mounting base for attachment to a supporting structure, means mounting said housing on said base for scanning motion relative to said base, means for driving said housing in its scanning motion, means for monitoring the position of said housing relative to said base, means for effecting focusing adjustment of said lens, and acoustic transducer means mounted on said housing for transmitting acoustic probing waves through the water in propagation direction generally for reflection from objects in the water to said lens as said water-borne waves.

* * * * *